United States Patent
Vignal

(10) Patent No.: US 7,914,383 B2
(45) Date of Patent: Mar. 29, 2011

(54) MECHANICAL TRANSMISSION SYSTEM WITH A MAGNETIC DAMPER FOR A ROTORCRAFT

(75) Inventor: Bérengère Vignal, Venelles (FR)

(73) Assignee: Eurocopter, Marignane Cedex (FR)

( * ) Notice: Subject to any disclaimer, the term of this patent is extended or adjusted under 35 U.S.C. 154(b) by 514 days.

(21) Appl. No.: 11/941,133

(22) Filed: Nov. 16, 2007

(65) Prior Publication Data

US 2008/0293503 A1 Nov. 27, 2008

(30) Foreign Application Priority Data

Nov. 16, 2006 (FR) ...................................... 06 10009

(51) Int. Cl.
*F16C 3/00* (2006.01)
(52) U.S. Cl. ........................ 464/180; 244/60; 310/90.5
(58) Field of Classification Search .................. 464/180; 310/90, 90.5; 188/156, 267–267.2, 271; 244/60; 416/500
See application file for complete search history.

(56) References Cited

U.S. PATENT DOCUMENTS

| 3,757,147 | A | * | 9/1973 | Lyman, Jr. | ................ 310/90 X |
| 4,236,426 | A | * | 12/1980 | Meinke et al. | ............ 464/180 X |
| 5,231,323 | A | * | 7/1993 | New | ............................ 310/90.5 |
| 5,521,448 | A | * | 5/1996 | Tecza et al. | .................. 310/90.5 |
| 2002/0065139 | A1 | | 5/2002 | Krysinski | |
| 2005/0200219 | A1 | | 9/2005 | Brunken | |

FOREIGN PATENT DOCUMENTS

| FR | 2 359 327 | 2/1978 |
| JP | 02 097742 | 4/1990 |
| WO | WO 99/50950 | 10/1999 |

* cited by examiner

*Primary Examiner* — Greg Binda
(74) *Attorney, Agent, or Firm* — Brooks Kushman P.C.

(57) ABSTRACT

The invention relates to a rotorcraft transmission system that comprises both a transmission shaft (21), and electromagnetic induction members (30, 31) of an active magnetic damper that extend around the shaft and that co-operate therewith to determine radial clearance (33). The system further comprises an additional radial damper (35) extending around the shaft with radial spacing (29) that is smaller than the radial clearance, such that in the event of the active magnetic damper failing, radial displacements of the shaft relative to its axis (22) are damped at least in part by the additional radial damper, so that damage to the induction members is limited or avoided.

14 Claims, 5 Drawing Sheets

MECHANICAL TRANSMISSION SYSTEM WITH A MAGNETIC DAMPER FOR A ROTORCRAFT

The present invention relates to a rotorcraft transmission system including a magnetic damper, and to a rotorcraft including such a system.

The technical field at the invention is that of manufacturing helicopters.

BACKGROUND OF THE INVENTION

The present invention relates in particular to a transmission system that includes a transmission shaft presenting two longitudinal ends, in which a connection member—such as a deformable coupling member—is fitted to each end of the shaft, the two connection members serving to connect the shaft to two respective rotary members of a rotorcraft such as a main gearbox (MGB) and a tail rotor gearbox (TRG) to enable the shaft to drive a rear—or "tail"—rotor of the rotorcraft by means of the TRG, via the MGB.

Patents FR 2 817 234 and U.S. Pat. No. 6,680,554 describe such a power transmission system between two gearboxes of a helicopter, the system comprising a (hollow) tube acting as a transmission shaft.

The shaft is said to be "supercritical" when the frequency corresponding to a speed of rotation of the shaft (in its normal operating range) is higher than the lowest resonant (natural) frequency of the shaft.

An active magnetic damper is placed between the two gearboxes; the damper is controlled by a computer making use of signals delivered by a sensor that is responsive to the lateral (radial) position of the shaft and that includes a proportional integral differential (PID) regulator for damping the vibrations of the shaft as it passes through resonant frequencies.

That magnetic damper corresponds to an active radial magnetic bearing that damps the vibrations of the shaft, that presents stiffness that is low enough to avoid shifting the natural frequencies of the shaft by more than 3%, and that presents a clearance of 3 millimeters (mm) to 4 mm relative to the shaft.

In particular because of the complex and critical nature of the hardware and software components of an active magnetic bearing, implementing such components on board a rotorcraft suffers from the large development costs needed to enable them to be qualified or certified.

Patents EP 1 068 665 et U.S. Pat. No. 6,268,676 describe a shaft-support system comprising a passive radial magnetic bearing in which the magnetic stator portion (i.e. nonrotary portion) is connected to a support by four elastomer dampers. The mass and the stability of such a system make it difficult to use for supporting a rotorcraft transmission shaft.

OBJECTS AND SUMMARY OF THE INVENTION

An object of the invention is to propose such mechanical transmission devices or systems that are improved and/or that remedy, at least in part, the shortcomings or drawbacks of known devices.

Unless stated explicitly or implicitly to the contrary, in the present application, terms such as "radial" or "radially" are relative to the longitudinal axis (of rotation) of the transmission shaft.

In one aspect, the invention provides a rotorcraft transmission system that comprises both a transmission shaft that may in particular be mounted to rotate relative to be rotorcraft via two non-magnetic bearings, and electromagnetic induction members of an active magnetic damper that extend around the shaft and that cooperate therewith to determine radial clearance, the system further comprising an additional—generally nonmagnetic—radial damper—referred to below as an NMRD—extending (without contact) around the shaft with radial spacing that is smaller than the radial clearance, such that in the event of the active magnetic damper failing, radial displacements of the shaft relative to its theoretical/nominal axis are damped (at least in part) by the supplemental radial damper, so that damage to the induction members is limited or avoided.

The NMRD comprises a "stator" first portion that is arranged to be secured to the structure of the rotorcraft, where appropriate via the stator portion of the active magnetic damper.

The NMRD further comprises a "floating" second portion that is movable radially relative to the first portion, surrounding the shaft with said radial spacing, and preferably being generally annular or ring shaped.

The NMRD also comprises a damper device that interconnects these two portions and damps movements of the second portion relative to the first portion. The damping performed by this device may result from solid/solid friction, or from optionally-viscous liquid/solid friction, in particular from dry friction between surfaces of parts connected respectively to the two portions of the NMRD.

The (radial) stiffness of the device interconnecting the two portions of the NMRD is low, in particular is substantially zero, and is preferably just sufficient to support the weight of the floating portion, i.e. a few tens or hundreds of grams.

BRIEF DESCRIPTION OF THE DRAWINGS

Other aspects, characteristics, and advantages of the invention appear in the following description that refers to the accompanying drawings showing, without any limiting character, preferred embodiments of the invention.

MORE DETAILED DESCRIPTION

Figure 1:
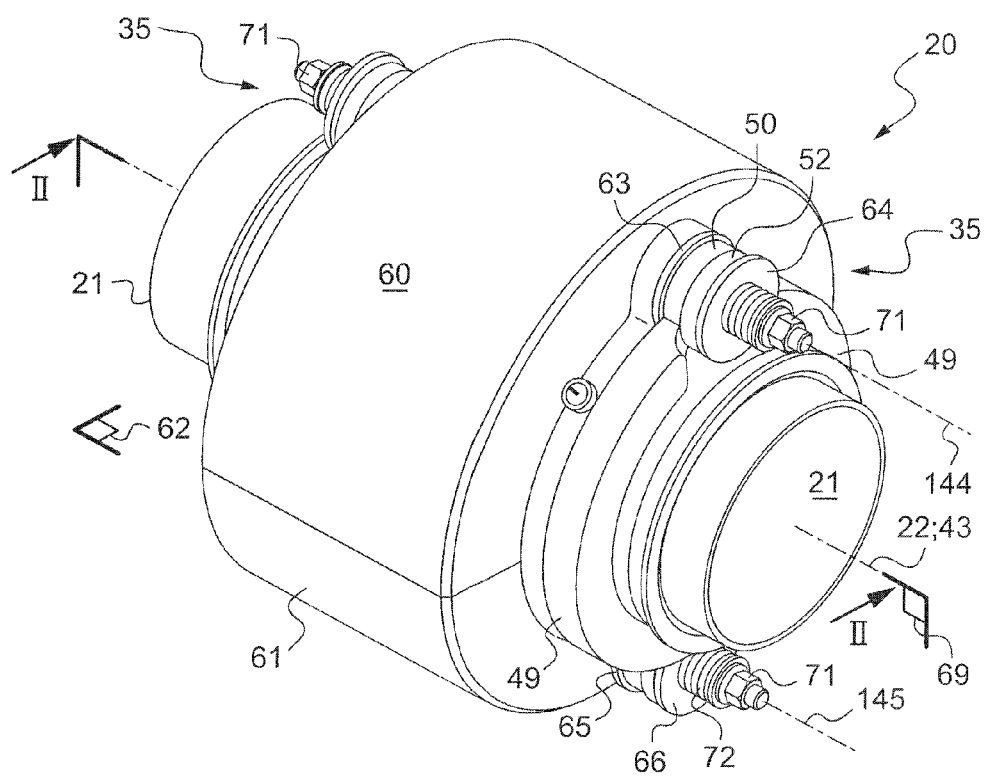
FIG. 1 is a diagrammatic perspective view of a device of the invention comprising a magnetic damper stator and two friction dampers secured to the stator, together with a segment of transmission shaft having a portion that is surrounded by the dampers.
Figure 8:
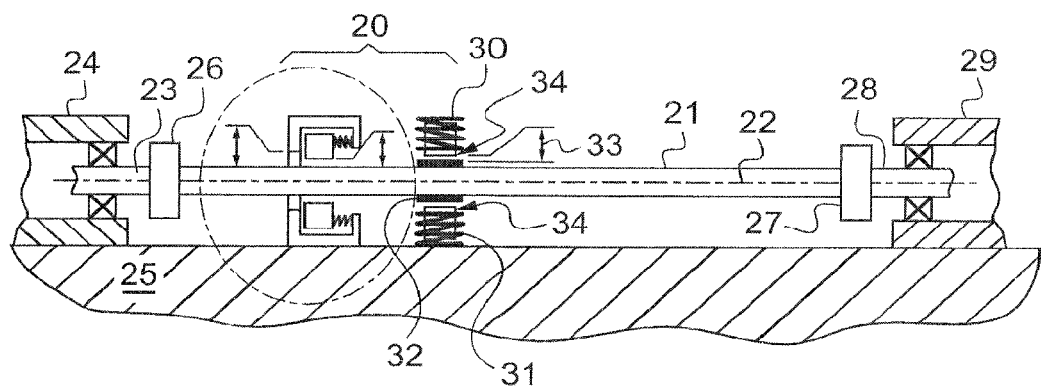
FIG. 8 is a diagram showing a transmission system of the invention and how it is integrated in a helicopter.

With reference to FIGS. 1 and 8 in particular, the damper device 20 of the invention is arranged to damp radial vibration of a transmission shaft 21 that extends along a longitudinal axis 22, which is also its axis of rotation.

With reference to FIG. 8, the shaft 21 is connected by means of a first constant-velocity coupling 26 to the outlet shaft 23 of the MGB 24, itself secured to the structure 25 of the helicopter.

In similar manner, the shaft 21 is connected by a second constant-velocity coupling 27 to the inlet shaft 28 of a TRG 29, itself secured to the tail boom of the helicopter.

The device 20 includes electromagnetic induction members 30, 31 secured to the structure of the helicopter and designed to be powered in such a manner as to generate an electromagnetic field that varies over time so as to damp radial vibration in the portion of the shaft that is surrounded by the induction members.

For this purpose, the outer portion or surface of the shaft 21 is made of a ferromagnetic material; in the embodiment shown in FIG. 8, the shaft has a ferromagnetic element in the form of a ring 32 surrounding—and constrained to rotate together with—the portion of the shaft that extends in register with the induction members.

The empty space between the outside surface of the ring 32 and the inside faces 34 of the induction members corresponds to radial clearance 33 that is close to 1 mm or 2 mm, for example.

Figure 8A:
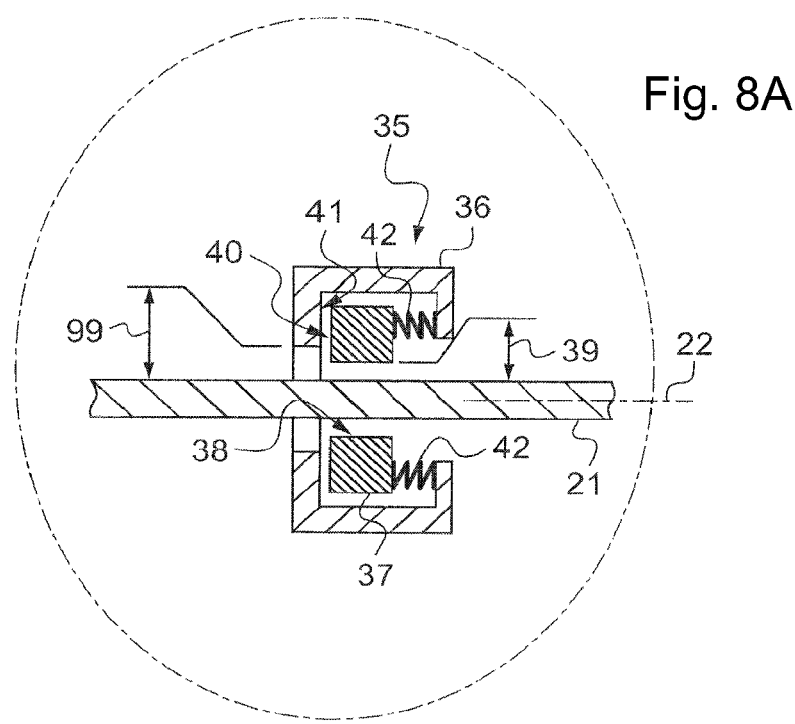
FIG. 8A shows a more detailed view of the inset in FIG. 8.

The portion of device 20 shown in FIG. 8A further includes a mechanical damper 35 that comprises both a stator portion 36 connected to the structure 25, and a portion 37 that is movably and/or floatingly mounted relative to the stator portion.

The floating portion 37 of FIG. 8A is in the form of a ring surrounding a zone of the shaft 21; the portion 37 presents a cylindrical inside face 38 that is substantially coaxial about the shaft 21, and of diameter that cooperates with the diameter of the shaft 21 to define a radial space 39 of value that is smaller than that of the clearance 33, e.g. close to half the clearance 33.

The ring 37 also presents a plane face 40 that is substantially perpendicular to the axis of the cylindrical face 38 (and consequent to the axis 22 of the shaft 21).

The stator portion 36 has a plane face 41 surrounding the shaft 21, with the face 40 of the floating ring 37 being in register therewith. A spring 42 holds the face of 40 of the ring 37 pressed against the face 41 of the stator support 36.

Radial clearance 99 greater than the radial space 39 is provided between the shaft 21 and the stator 36 of the damper 35.

Thus, when the shaft 21 comes into contact with the face 38 of the ring 37 and radially moves the ring that is resting against the bearing face 41, friction forces oppose mutual displacement between the pressed-together faces 40 and 41, thereby damping radial displacement of the shaft 21.

Figure 5:
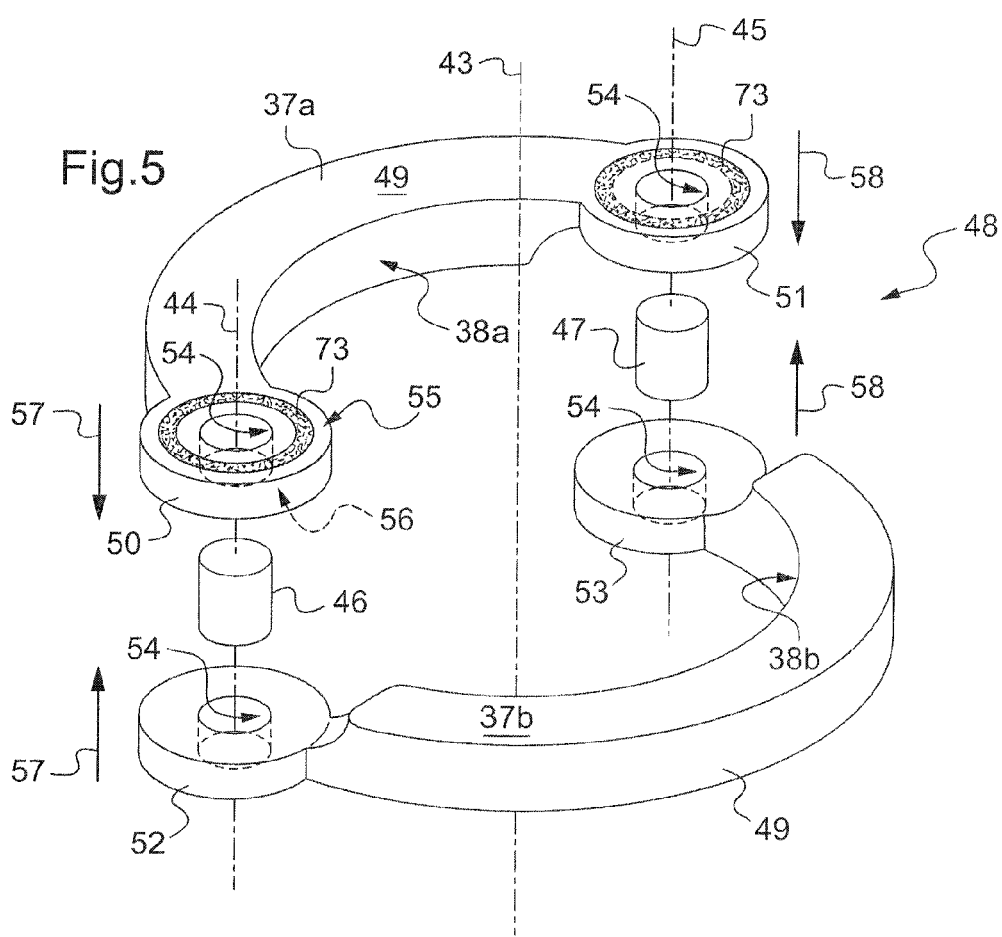
FIG. 5 is an exploded, simplified diagrammatic perspective view of floating and/or moving parts of the friction damper of FIGS. 1 and 2.

In order to facilitate engagement of the floating ring around the transmission shaft, the ring may be replaced by the floating structure 48 shown in an exploded view in FIG. 5.

The structure 48 comprises two parts 37a and 37b generally in the form of half rings that may be identical and that are secured to each other in particular by means of two tubular bushings at 46 and 47.

Each of the parts 37a and 37b comprises a body 49 in the form of an arc terminated at each of its two ends by a respective pad 50 to 53 of annular shape.

Each pad (such as 50) is pierced by a bore 54 of axis 44 (or 45) and has two plane parallel face is 55, 56 perpendicular to the axis 44.

In order to secure the two parts of 37a, 37b together, as shown in FIG. 5, these parts are moved towards each other as represented by arrows 57, 58, while ensuring that their axes 44, 45 are parallel to an axis of symmetry 43 of the assembly, with each of the bushings of 46, 47 being engaged in part in both of the corresponding bores 54 that are in alignment.

Figure 2:
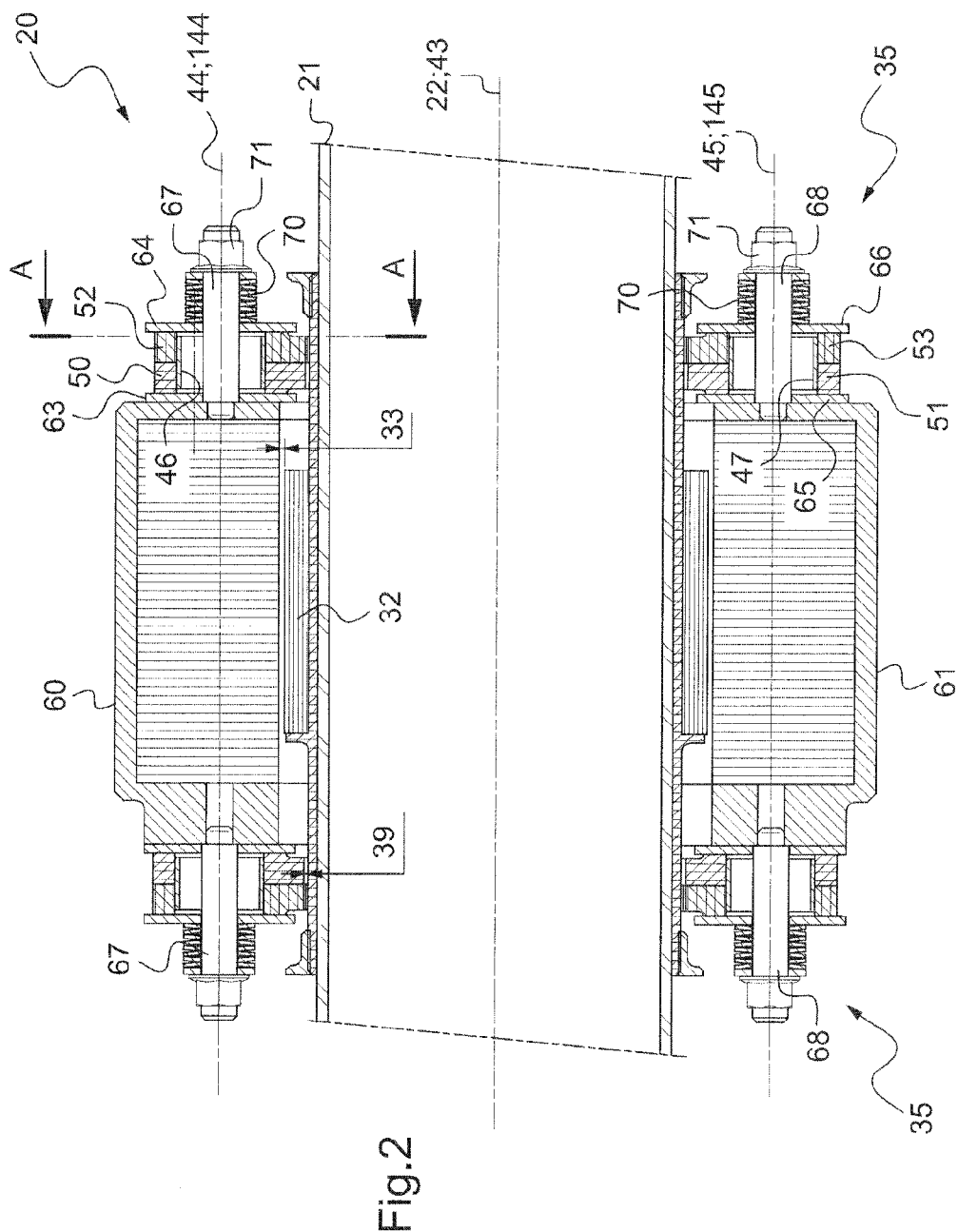
FIG. 2 is the view on II-II of FIG. 1, i.e. a section view of the device on a "diametral" plane containing the axis of rotation of the transmission shaft.

This assembly configuration is shown in particular in FIGS. 1 and 2 where it can be seen that the pads 50 to 53 present thickness close to half the thickness of the bodies 49 of the floating parts 37a, 37b.

In FIGS. 1 and 2 it can be seen that the magnetic damper including the induction members has two parts 60, 61 in the form of substantially identical shells that are mutually in contact substantially along a diametral plane 62 containing the axis 22 of the shaft 21; these two parts are secured together by releasable connection members (not shown) such as bolts, thus making the bearing and/or of the magnetic damper easier to assemble and/or disassemble.

It can also be seen in FIGS. 1 and 2 that the damper system has two identical mechanical (friction) dampers 35 disposed on either side of the stator 60, 61 of the magnetic damper.

The stator portion of each damper 35 has two pairs of plates 63 to 66 in the form of respective disks pierced by central openings, and two rods 67, 68 having respective axes 144, 145 parallel to the axis 21 and contained in a diametral plane 69 orthogonal to the plane 62 and containing the axis 21; the rods 67, 68 are secured respectively to the parts 60, 61 of the stator of the magnetic damper.

This stator portion also includes spring washers 70 and a nut 71 for each rod 67, 68. In the variant shown in FIGS. 1 and 3, a helical spring 72 replaces the washers.

Figure 3:
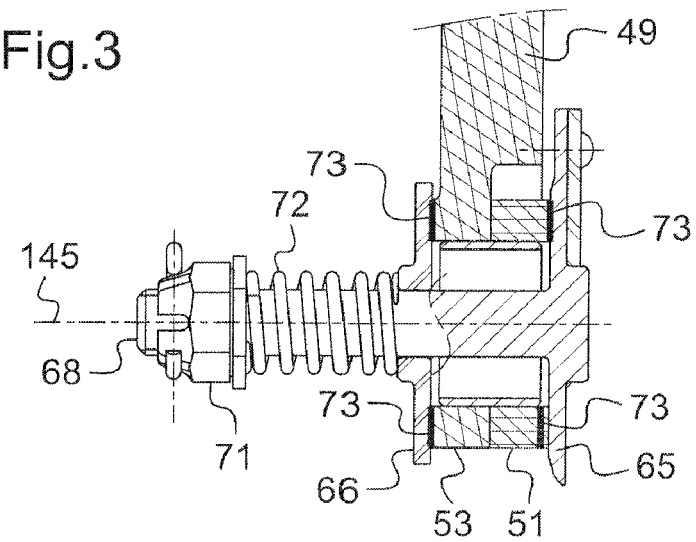
FIG. 3 is a section view of a portion of a friction damper of the system of the invention, such as the systems shown in FIGS. 1, 2, and 4 to 7, show in greater detail the positions of the friction surfaces.

As shown in FIGS. 1 to 3, each rod extends successively through a plate 63, 65 pressed against the stator 60, 61 via one of the bushings 46, 47 for coaxially fastening the floating pads 50 to 53, and through a second plate 64, 66, and also through washers 70 (of the spring 72).

The nut 71 screwed to the threaded free end of each rod bears against the plate 64, 66 via the spring or the washers, so the pads (such as 50 and 52) are thus pinched lightly between the two plates (such as 63 and 64).

FIGS. 3 and 5 show in particular the ring-shaped surface 73 whereby each floating pad bears against the 15 corresponding stator plate (63 to 66).

Each floating assembly of a damper 35 is caused to bear lightly against the stator plates by four friction surfaces 73 by adjusting the position of the "pre-stress" nut 71 on the corresponding rod 67, 68.

Figure 6:
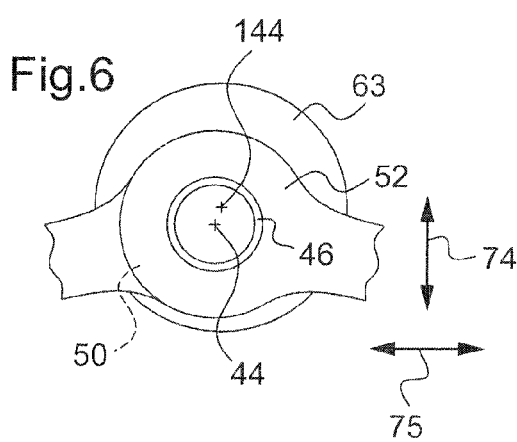
FIGS. 6 and 7 are diagrams showing that the relative movements of the friction surfaces of a friction damper as shown in FIGS. 1 to 5.

This light bearing force enables the pads 50 to 53 to slide—with friction—on the plates 63 to 66, and in particular to slide in translation (in a radial plane) as represented by arrows 74 and 75 in FIG. 6.

Such movement of the pads relative to the plates is caused by the shaft 21 bearing against the inside cylindrical faces 38, 38a, 38b of the floating arcs 37a, 37b. This movement is made possible by the clearance between the inside diameter of the bushings 46, 47 and the outside diameter of the rods 67, 68.

Figure 7:
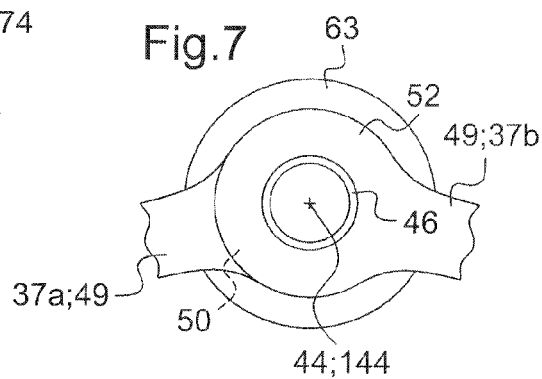

This movement can cause the pads to go from the initial, "centered" position shown in FIG. 7, in which the axis 44 of the pads coincides with the axis 144 of the rod (referenced 67 or 68 {FIG. 2), to an off-center position shown in FIG. 6 in which the two axes no longer coincide.

It will be understood that making the floating element of the mechanical damper with at least two parts makes it easier to assemble and disassemble the damper 35 and/or the shaft 21.

Figure 4:
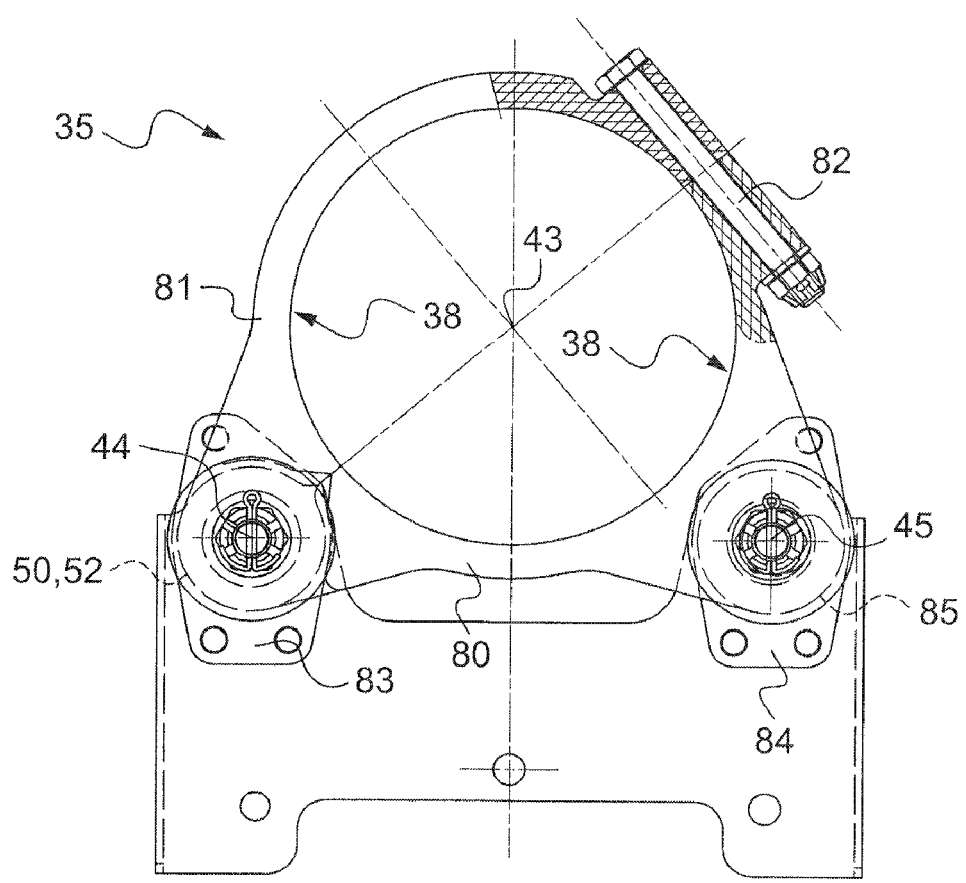
FIG. 4 shows variant embodiment of a friction damper of a system of the invention.

FIG. 4 shows a variant embodiment of this damper in which the two floating arcs or half-collars 80 and 81 are held together firstly by a bolt 82 and secondly by a bushing for assembling together their pads 50, 52 that are superimposed along the axis 44.

In this configuration, one of the pads (such as 50) bears against a plate 83 secured to the structure of the rotorcraft, while the other pad 85 secured to the arc 80 bears along an axis 45 against a second plate 84 likewise fastened to the structure of the rotorcraft. Unlike the embodiment of FIGS. 1, 2, 5, it can be seen that that the friction pads 50, 52, 85 are not diametrically opposite.

The damping coefficient of this device is preferably high, in particular the same order of magnitude as the damping coefficient of the magnetic damper.

The value of the damping coefficient of the damper device of the NMRD expressed in newton seconds per meter ($Nsm^{-1}$) preferably lies in the range about 100 to about 5000, while the value of the damping coefficient of the magnetic damper device may lies in the range about $100 \, Nsm^{-1}$ to about $1000 \, Nsm^{-1}$.

By way of example, a friction damper presenting a radial damping coefficient equal to $800 \, Nsm^{-1}$ and a magnetic damper presenting a radial damping coefficient equal to $400 \, Nsm^{-1}$ with radial stiffness equal to about $150\,000 \, Nm^{-1}$ have given satisfactory results.

In a preferred embodiment, the value of the ratio of the damping coefficient (in $Nsm^{-1}$) of the magnetic damper over the stiffness of the magnetic damper (in newtons per meter) may lie in the range about $10^{-3}$ s to about $10^{-2}$ s.

What is claimed is:

1. A rotorcraft transmission system comprising:
    a supercritical transmission shaft (21) that has two longitudinal ends, each of which is fitted with a respective connection member;
    an active magnetic damper between the connection members, the active magnetic damper having electromagnetic induction members (30, 31) that extend around the supercritical shaft and that co-operate therewith to determine a radial clearance (33), and two stator shells (60, 61) around the induction members and in mutual contact along a diametrical plane containing a longitudinal axis (22) of the supercritical shaft; and
    two additional radial dampers (35) at longitudinal ends of at least one of the two shells, the two radial dampers disposed on the shaft with radial spacing (39) that is smaller than the radial clearance,
    each of said additional radial dampers comprising a rod that secures a respective one of said two stator shells of said active magnetic damper, a stator portion (36) through which the rod extends and that is adapted to be secured to a structure (25) of a rotorcraft, and a floating portion (37) movable radially relative to the stator portion and surrounding said transmission shaft with said radial spacing (39), said floating portion (37) having pads (50-53) with annular surfaces (40, 73) and said stator portion (36) having disks (63-66) with surfaces (41) opposing said annular surfaces, wherein damping by said additional radial damper results from friction between said annular surfaces (40, 73) and said surfaces (41) opposing said annular surfaces.

2. A system according to claim 1, in which a damping coefficient of the additional radial damper is of the same order of magnitude as a damping coefficient of the active magnetic damper.

3. A system according to claim 1, in which the floating portion presents the general shape of a ring or an annulus.

4. A system according to claim 1, in which the floating portion comprises a plurality of parts (37a, 37b) interconnected by connection members (46, 47).

5. A system according to claim 1, in which the stator portion of the additional damper is adapted to be secured to the structure of the rotorcraft via a stator portion of the active magnetic damper.

6. A system according to claim 1, in which an outer portion or surface of the shaft (21) is made of a ferromagnetic material.

7. A system according to claim 1, in which the shaft includes a ferromagnetic element in the form of a ring (32) surrounding the portion of the shaft that extends in register with the induction members.

8. A system according to claim 1, in which the value of the damping coefficient of the additional damper device lies in the range about $100 \, Nsm^{-1}$ to about $5000 \, Nsm^{-1}$.

9. A system according to claim 1, in which the value of the damping coefficient of the magnetic damper device lies in the range about $100 \, Nsm^{-1}$ to about $1000 \, Nsm^{-1}$.

10. A system according to claim 1, in which the value of the ratio of the damping coefficient (in $Nsm^{-1}$) of the magnetic damper over the stiffness of the magnetic damper (in newtons per meter) lies in the range about $10^{-3}$ s to about $10^{-2}$ S.

11. A system according to claim 1, in which radial stiffness of the additional radial damper is sufficient to support the weight of the floating portion.

12. A rotorcraft including a system according to claim 1.

13. A rotorcraft according to claim 12, in which the shaft (21) is connected via couplings (26, 27) to two shafts (23, 28) mounted to rotate relative to the rotorcraft.

14. A system according to claim 1, wherein the transmission shaft is hollow.

\* \* \* \* \*